H. B. PARK.
Air-Pressure Fluid-Vents.

No. 198,672. Patented Dec. 25, 1877.

Witness
H. J. Smith
S. S. Bissell

Inventor.
Hardy B. Park

UNITED STATES PATENT OFFICE.

HARDY B. PARK, OF DALLAS, TEXAS.

IMPROVEMENT IN AIR-PRESSURE FLUID-VENTS.

Specification forming part of Letters Patent No. 198,672, dated December 25, 1877; application filed July 7, 1877.

*To all whom it may concern:*

Be it known that I, HARDY B. PARK, of Dallas, in the county of Dallas and State of Texas, have invented certain new and useful Improvements in Air-Pressure Automatic Fluid-Vents, for use in the discharge of all liquids; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the use of the ordinary spigot in drawing off any liquid substance, it becomes necessary to remove the spigot, or the contents of a cask or vessel cannot be discharged. Devices to facilitate the flow of liquids from closed vessels have been heretofore applied with partial success. I know of no device for the purpose that is not dependent on the hand and eye for its usefulness.

My invention presents an improved device for the obviation of certain deficiencies in such apparatus.

In the construction of my automatic vent I form the cylinder in which the self-acting parts of the arrangement are placed with an expanded flange or rim. The bore-hole passing through it is true, and in the under face of the flange I bore out a shallow seat, which has shoulders nearly one-eighth of an inch wider than the center-bored hole. In the center hole a stem is fitted to work without restraint by tightness of fit, which has also three slots (longitudinal) as air-passages. One end of the stem is provided with a head, which fits easily in the seat formed in the lower cylinder end. I cut a gasket of rubber or other suitable material, and slip it on the stem and down on the head. There is then provided a good air-tight joint, when the stem is entered into the hole in the center of the cylinder, and the stem-head, with its rubber gasket, placed in the shallow seat in the lower end of the cylinder.

When the rubber gasket is in its place on the stem, I pass the stem into the hole in the center of the cylinder, and on the end of the stem which protrudes through the cylinder I affix a helical spring, to hold the spring down to the upper shoulder of the cylinder. A burr is riveted on the point of the stem, to retain the compression of the spring.

Figure 1:
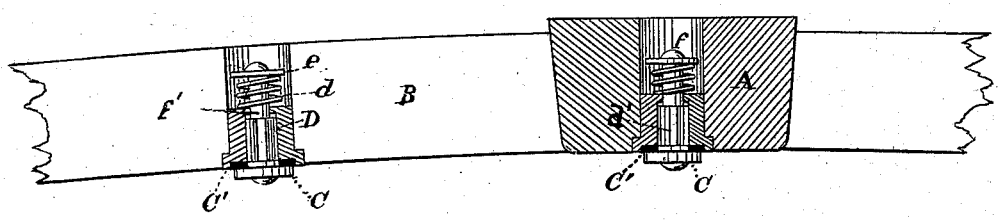
Figure 2:
Figure 3:
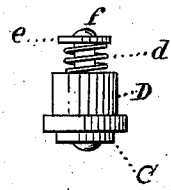

Referring to the accompanying drawings, Figure 1 is a sectional view of bung-stave of a barrel, showing the vent inserted in both stave and bung. Fig. 2 is a view of valve-head. Fig. 3 is a perspective view of the vent.

A is the bung; B, the stave, showing two views of vents in such positions as suit, or the vent may be placed elsewhere; C, valve-head; $c'$, Fig. 1, gasket of packing material; D, cylinder; $d$, helical spring of valve-stem; $d'$, slots for the passage of air down the stem $f'$ of the valve; $e$, button on end of valve-stem; $f$, stem-button rivet.

The operation of my improved vent is as follows: Into a suitable-sized hole in any cask or closed vessel containing a fluid press the cylinder D, either in the bung, staves, or head, either from the under side of the bung or from the upper side, only observing that the cylinder makes a tight fit in the wood, and that the valve end is downward. The spring at all times holds the valve on the stem in the seat without the admission of any air. Upon the usual discharge faucet or spigot being opened to draw out any of the contained fluid within the vessel, the removal of any part will cause a partial vacuum, which very soon will overcome the resistance of the spring on the valve-stem. The air will, in consequence, pass inward and fill the vacancy caused by the removal of the contained fluid. Whenever the suction is less than the resistance to the opening of the valve it closes, no air not required goes into the vessel, nor can any of the contained gases or volatile matters escape.

What I claim as my invention is—

The cylinder D, combined with the valve C on the closely-fitting slotted stem $f$, the replacing-spring $d$, and packing $c'$, as and for the purposes herein described.

In testimony that I claim the foregoing as my own invention I affix my signature in presence of two witnesses.

HARDY B. PARK.

Witnesses:
SEPHRENESS M. HICKEY,
M. L. GRAY.